(12) United States Patent
Akagi

(10) Patent No.: US 6,519,687 B2
(45) Date of Patent: Feb. 11, 2003

(54) FILE MIRRORING DRIVE THAT MIRRORS DATA ON A FILE BASIS

(75) Inventor: Kenichiro Akagi, Tokyo (JP)

(73) Assignee: NEC Corporation, Tokyo (JP)

( * ) Notice: Subject to any disclaimer, the term of this patent is extended or adjusted under 35 U.S.C. 154(b) by 66 days.

(21) Appl. No.: 09/862,520

(22) Filed: May 23, 2001

(65) Prior Publication Data

US 2001/0052059 A1 Dec. 13, 2001

(30) Foreign Application Priority Data

May 24, 2000 (JP) ........................................ 2000-153210

(51) Int. Cl.[7] ................................................ G06F 11/20
(52) U.S. Cl. ........................ 711/162; 711/111; 711/114; 711/161
(58) Field of Search ................................ 711/114, 156, 711/161, 162

(56) References Cited

U.S. PATENT DOCUMENTS 5,893,919 A * 4/1999 Sarkozy et al. ............. 711/114
5,974,506 A * 10/1999 Sicola et al. ................ 711/119
6,098,119 A * 8/2000 Surugucchi et al. .......... 710/10
6,385,707 B1 * 5/2002 Maffezzoni ................. 711/162
6,405,284 B1 * 6/2002 Bridge ....................... 711/114

\* cited by examiner

Primary Examiner—T. V. Nguyen
(74) Attorney, Agent, or Firm—Sughrue Mion, PLLC

(57) ABSTRACT

A file access processor, which accesses a storage unit storing a plurality of files therein based on an access request from a request source, according to the present invention has a mirroring relation storage unit in which mirroring relation information is stored, wherein the mirroring relation information includes a mirroring attribute value indicating whether or not each file is to be mirror-accessed and, when the file is to be mirror-accessed, mirroring file information indicating a mirroring file corresponding to the file; and a file access processing unit which references the mirroring relation information based on the access request and accesses the storage unit.

6 Claims, 3 Drawing Sheets

FILE MIRRORING DRIVE THAT MIRRORS DATA ON A FILE BASIS

BACKGROUND OF THE INVENTION

The present invention relates to a file mirroring drive, and more particularly to a file mirroring drive that mirrors data on a file basis.

In general, a disk failure that occurs in a data processor sometimes destroys files and results in a loss of critical data. One way to prevent data from being destroyed is to mirror a disk. That is, all data in a disk is copied to another place. A conventional data processor duplicates data on a disk volume basis to prevent data from being destroyed.

However, on a unit such as a personal computer, the critical files to be duplicated are only apart of all files. Considering the cost, it is not practical to mirror data on a volume basis. Because the minimum unit of mirroring is a disk volume, the whole disk volume must be mirrored at mirroring time even if the user wants only some files to be fault-tolerant.

SUMMARY OF THE INVENTION

The object of the present invention is to provide a file access processor which mirrors data on a file basis.

According to one aspect of the present invention, a file access processor, which accesses a storage unit storing a plurality of files therein based on an access request from a request source, is provided which includes: a mirroring relation storage unit in which mirroring relation information is stored, wherein the mirroring relation information includes a mirroring attribute value indicating whether or not each file is to be mirror-accessed and, when the file is to be mirror-accessed, mirroring file information indicating a mirroring file corresponding to the file; and a file access processing unit which references the mirroring relation information based on the access request and accesses the storage unit.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

A first embodiment of the present invention will be described in detail below.

Figure 1:
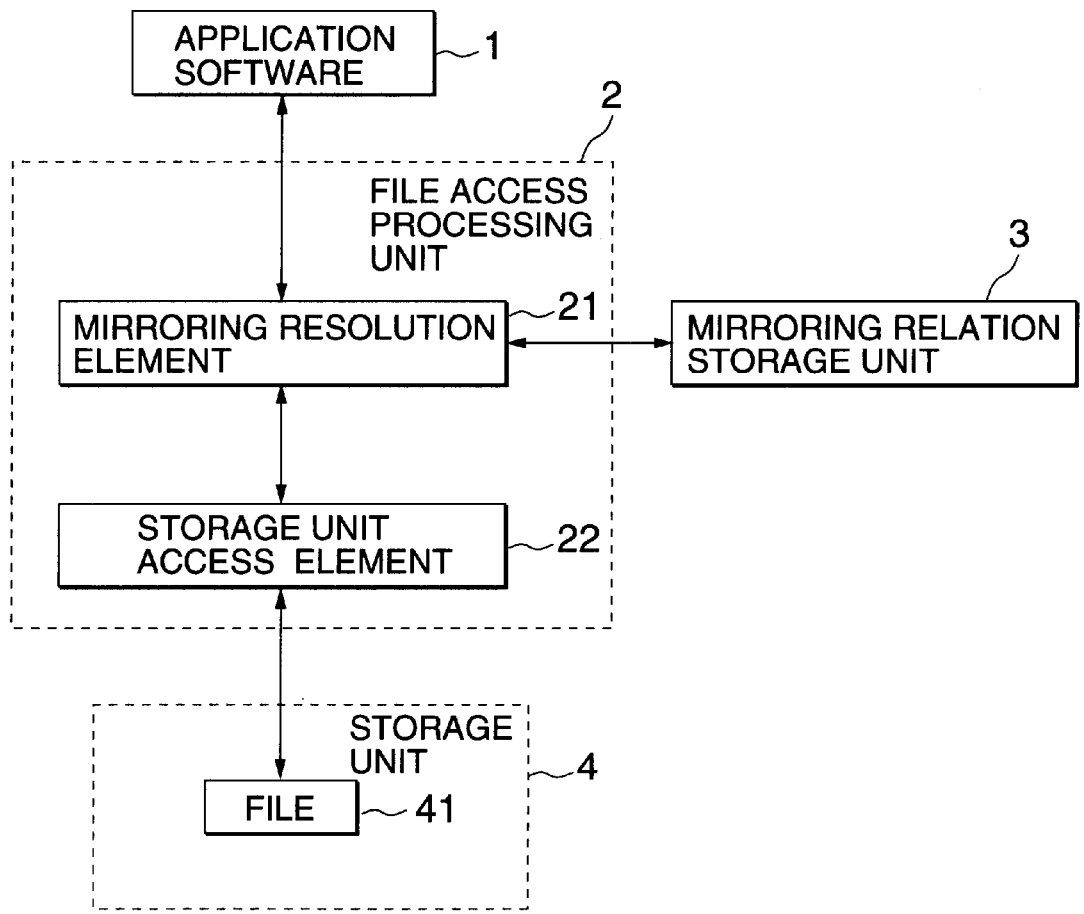
FIG. 1 is a block diagram showing an example of a file access processor according to the present invention.

Referring to FIG. 1, a file access processor according to the present invention includes a file access processing unit 2 and a mirroring relation storage unit 3. A storage unit 4 is connected to the file access processing unit 2. In response to a file access request from an application software program 1 running in a higher-level element, the file access processing unit 2 processes the access request and accesses a file 41 stored in the storage unit 4.

The mirroring relation storage unit 3 contains information on the mirroring relation of files. More specifically, the mirroring relation storage unit 3 contains, for each file in the storage unit 4, a mirroring attribute value indicating whether or not the file is to be mirror-accessed (that is, access both the original file and the mirroring file) and, when the file is to be mirror-accessed, information indicating a mirroring file corresponding to the file.

The storage unit 4 stores a file 41. A plurality of files 41 are stored in the storage unit 4. In response to an access request from the file access processing unit 2, the storage unit 4 access the requested file 41.

The file access processing unit 2 includes a mirroring resolution element 21 and a storage unit access element 22. In response to an access request from the application software program 1, the mirroring resolution element 21 obtains from the mirroring relation storage unit 3 the mirroring relation information on a file to be accessed. As described above, the mirroring relation information has the mirroring attribute value indicating whether or not the file is to be mirror-accessed and, if certain the file is to be mirror-accessed, information (mirroring file information) indicating a mirroring file that corresponds to the original file to be accessed. In this embodiment, mirroring resolution element 21 may be a driver for an information processing device like a computer which contains application software 1, file access processing unit 2 and mirroring relation storage unit 3. And mirroring relation storage unit 3 may be stored in a file system.

Based on the mirroring attribute value, the mirroring resolution element 21 determines whether or not the file to be accessed is to be mirror-accessed. If the file is not to be mirror-accessed, the mirroring resolution element 21 issues an ordinary file access request to the storage unit access element 22, which processes the request as an ordinary request.

On the other hand, if the mirroring attribute value indicates that the file is to be mirror-accessed, the mirroring resolution element 21 uses the corresponding mirroring file information obtained from the mirroring relation storage unit 3 to issue two access requests to the storage unit access element 22; one is a request to access the file to be accessed and the other is a request to access the mirroring file containing the identical contents.

In response to the request(s) to access a file (or files) from the mirroring resolution element 21, the storage unit access element 22 accesses the file(s) 41 in the storage unit 4 corresponding to the access request(s). The storage unit access element 22 sends the access result(s) to the mirroring resolution element 21.

When the mirroring resolution element 21 receives the result of a non-mirroring, ordinary access request from the storage unit access element 22, the mirroring resolution element 21 sends the result back to the application software program 1. On the other hand, when the file was mirror-accessed and the mirroring resolution element 21 receives the access results of the two files from the storage unit access element 22, the mirroring resolution element 21 checks if the results match. If they match, the mirroring resolution element 21 sends the access result to the application software program 1 assuming that processing has been terminated normally. If the access results mismatch, the mirroring resolution element 21 performs error processing.

Next, the operation of the embodiment will be described.

Figure 2:
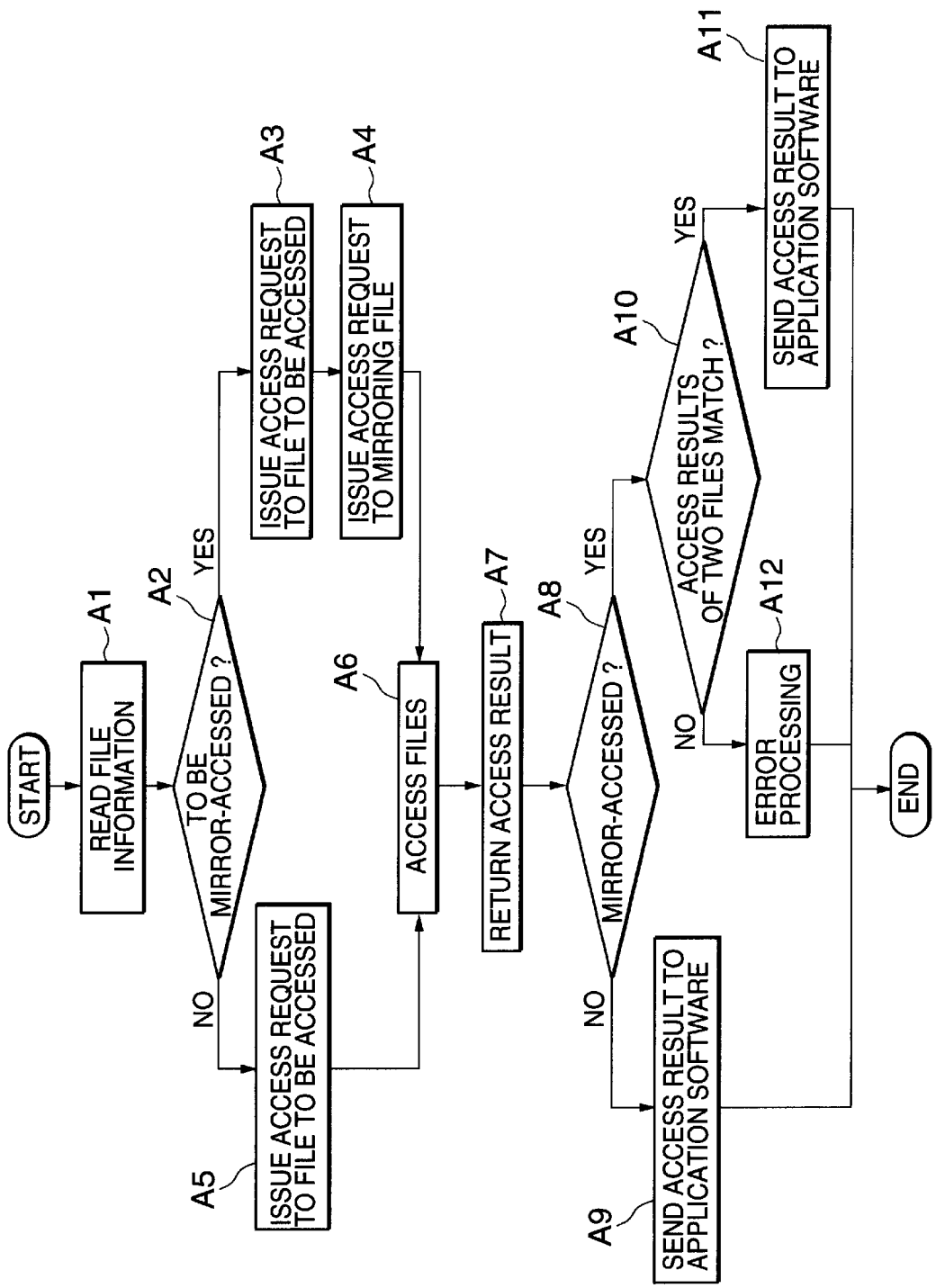
FIG. 2 is a flowchart showing the operation of the file access processor shown in FIG. 1.

Referring to FIG. 2, a request to access the file 41 issued from the application software program 1 is sent to the mirroring resolution element 21. The mirroring resolution element 21 reads the mirroring relation information on the file specified by the access request from the mirroring relation storage unit 3 (step A1). The mirroring relation information obtained in this step includes the mirroring attribute value indicating whether or not the file is a mirror access file and, when the file is to be mirror-accessed, mirroring file information indicating the corresponding mirroring file. The mirroring resolution element 21 checks the obtained mirroring attribute value to determine if the file is to be mirror-accessed (step A2). As a result, if the file is not to be mirror-accessed, the mirroring resolution element 21 issues a request to access the file to be accessed to the storage unit access element 22 (step A5). On the other hand, if the file is to be mirror-accessed, the mirroring resolution element 21 sends a request to access the file to be accessed to the storage unit access element 22 (step A3). At the same time, the mirroring resolution element 21 sends the same request to access the mirroring file of the file specified by the request to the storage unit access element 22 (step A4). The information on the mirroring has already been obtained in step A1 in FIG. 2.

In response to the file access request(s), the storage unit access element 22 accesses the file(s) 41 in the storage unit 4 (step A6). The storage unit access element 22 returns the access result(s) to the mirroring resolution element 21 (step A7). The mirroring resolution element 21 checks the mirroring attribute value again and determines whether or not the accessed file is to be mirror-accessed (step A8). If the mirroring attribute value in question is stored in a memory in the course of step A1, the mirroring resolution element 21 can retrieves it shortly rather than accesses the mirroring relation storage unit 3 again. If the mirroring resolution element 21 finds, as a result of checking, that the accessed file was not mirror-accessed, the mirroring resolution element 21 sends the access result to the application software program 1 and terminates access processing (step A9). On the other hand, if it is found, as a result of checking, that the accessed file was mirror-accessed, the mirroring resolution element 21 determines whether or not the access result of the original file and the access result of the mirroring file match (step A10).

If the two access results match, the mirroring resolution element 21 returns the access result to the application software program 1 assuming that the processing has been terminated normally (step A11). If the two access results do not match, the mirroring resolution element 21 performs error processing (step A12).

Figure 3:
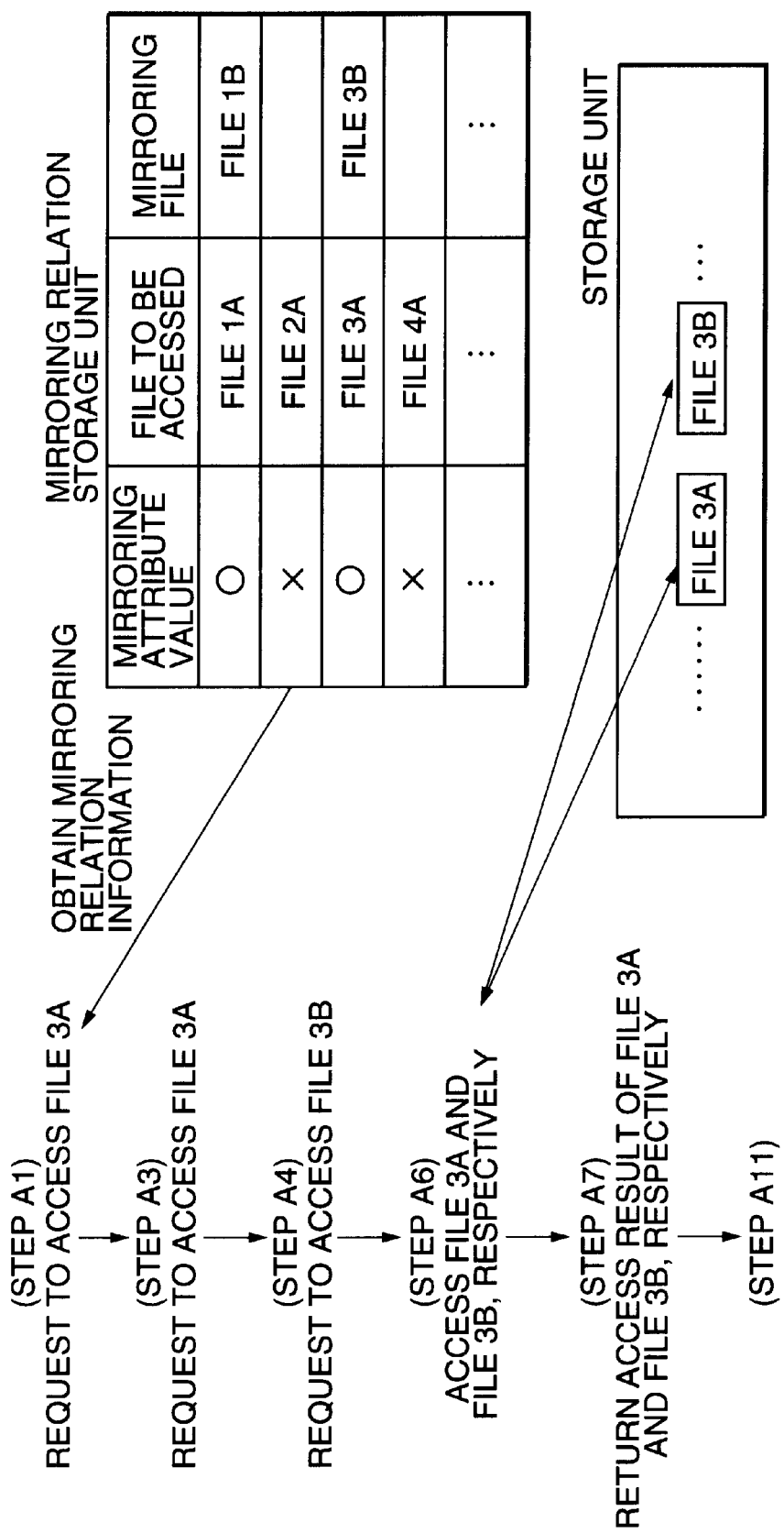
FIG. 3 is a diagram showing in more detail the operation of the file access processor shown in FIG. 1

More specifically, assume that the mirroring relation storage unit 3 contains mirroring information on file 1A, file 2A, file 3A, and file 4A as files to be accessed, as shown in FIG. 3. The mirroring attribute value column indicates whether or not a file to be accessed is to be mirror-accessed, and the mirroring file column indicates the mirroring file of a file to be accessed.

When an access request is issued from the application software program 1 to file 3A, it is sent to the mirroring resolution element 21. The mirroring resolution element 21 obtains mirroring relation information on file 3A from the mirroring relation storage unit 3 (step A1). The obtained mirroring attribute value of file 3A indicates that the file is to be mirror-accessed (step A2). The mirroring resolution element 21 issues a request to access file 3A, the original file, to the storage unit access element 22 (step A3). At the same time, because the obtained mirroring relation information indicates that the mirroring file is file 3B, the mirroring resolution element 21 also sends a request to access file 3B to the storage unit access element 22 (step A4).

In response to the request to access file 3A and the request to access file 3B, the storage unit access element 22 accesses file 3A and file 3B in the storage unit 4 respectively (step A6). The storage unit access element 22 returns the access results of both files to the mirroring resolution element 21 (step A7). The mirroring resolution element 21 checks again if the file is a mirror-access file (step A8) and then checks if the access result of file 3A matches the access result of file 3B (step A10). If the access result of file 3A matches the access result of file 3B, the mirroring resolution element 21 sends the access result of file 3A to the application software program 1 assuming that the processing has been terminated normally (step A11). If the access results of file 3A and file 3B do not match, the mirroring resolution element 21 performs error processing (step A12).

As described above, the file access processor according to the present invention allows the user to mirror data on a file basis and, as a result, to duplicate critical files with fewer disk resources, thus increasing disk fault tolerance.

While this invention has been described in conjunction with the preferred embodiments described above, it will now be possible for those skilled in the art to put this invention into practice in various other manners.

What is claimed is:

1. A file access processor, which accesses a storage unit storing a plurality of files therein based on an access request from a request source, comprising:

a mirroring relation storage unit in which mirroring relation information is stored, wherein said mirroring relation information includes a mirroring attribute value indicating whether or not each file is to be mirror-accessed and, when the file is to be mirror-accessed, mirroring file information indicating a mirroring file corresponding to the file; and a file access processing unit which references said mirroring relation information based on the access request and accesses said storage unit.

2. The file access processor as claimed in claim 1, wherein said file access processing unit comprises:

a mirroring resolution element which obtains the mirroring relation information of a file specified by the access request from said mirroring relation storage unit, determines whether or not the file is to be mirror-accessed based on the mirroring relation information, and generates a file access request; and a storage unit access element which accesses said storage unit based on the file access request.

3. The file access processor as claimed in claim 2, wherein, when the file is mirror-accessed, said mirroring resolution element issues a file access request to the file to be accessed and, based on the mirroring relation information, issues an access request to the mirroring file corresponding to said file to be accessed.

4. The file access processor as claimed in claim 2, wherein, when the file is not mirror-accessed, said mirroring resolution element returns an access result to the request source based on the access result from the storage unit.

5. The file access processor as claimed in claim 3, wherein, when the file is mirror-accessed, said mirroring resolution element receives a first access result corresponding to the file and a second access result corresponding to the mirroring file from said storage unit access element, determines whether or not said first access result and said second access result match, and, if they match, returns one of said first and second access results to the request source determining that processing has been terminated properly.

6. The file access processor as claimed in claim 5, wherein, when the first and second access results do not match, said mirroring resolution element performs error processing.

* * * * *